Aug. 1, 1961   D. M. SMITH ET AL   2,994,412
DETENT MECHANISM FOR A WATTHOUR METER
Filed Dec. 31, 1958
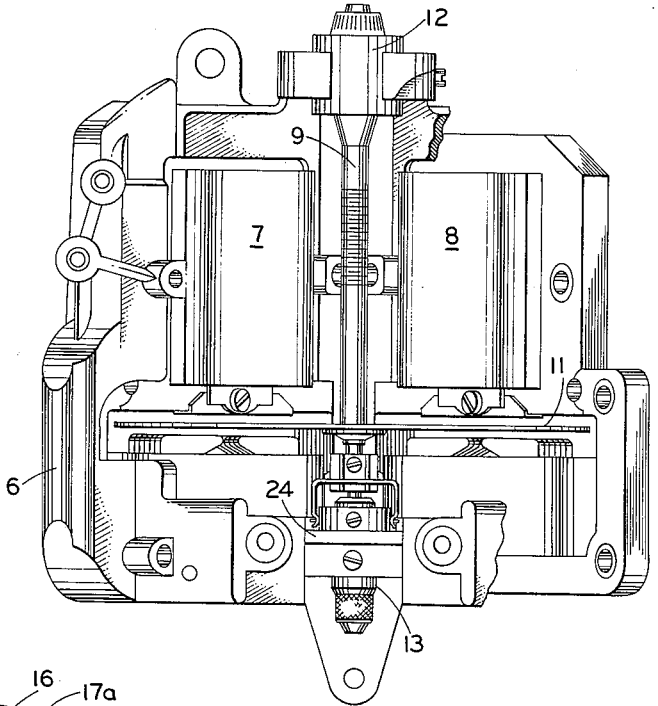
Fig. 1
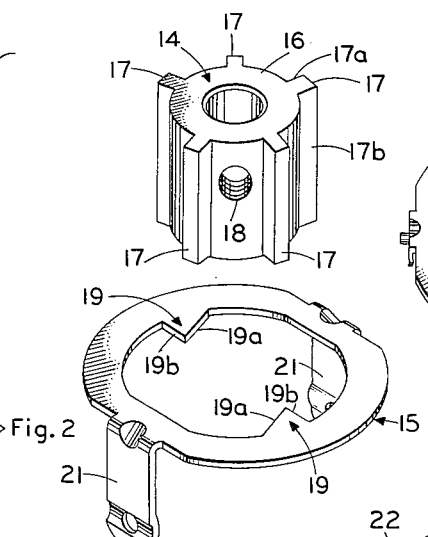
Fig. 2
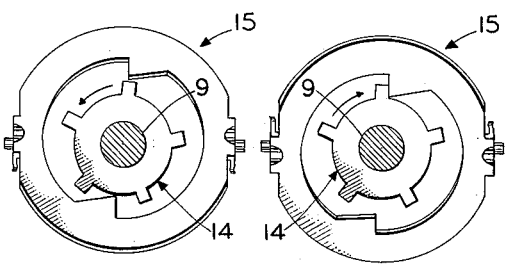
Fig. 4   Fig. 5
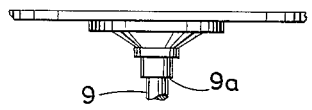
Fig. 3
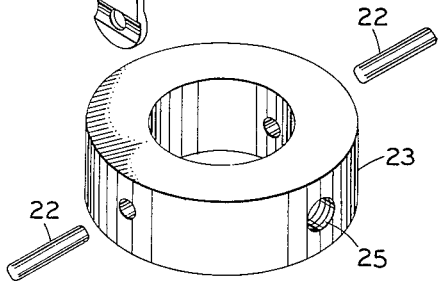
*INVENTORS.*
Donald M. Smith
Victor E. Sodergren
BY Robert F. Beck
Their Attorney United States Patent Office 2,994,412
Patented Aug. 1, 1961

2,994,412
DETENT MECHANISM FOR A WATTHOUR METER
Donald M. Smith, Berwick, Maine, and Victor E. Sodergren, Lynnfield, Mass., assignors to General Electric Company, a corporation of New York
Filed Dec. 31, 1958, Ser. No. 784,146
4 Claims. (Cl. 188—82.7)

This invention relates to an improved detent mechanism for an induction watthour meter which allows rotation of the meter in only one direction.

There are a number of applications for induction watthour meters, mostly in connection with polyphase power systems, in which it is possible for the meters to run backwards as the result of reverse power flow through the meter and thus subtract from the previous meter reading. For example, in the case of power interchange tie-line metering, power may flow in either direction between two utility systems and a single watthour meter without a detent mechanism would rotate in either direction depending upon the power flow in the interchange and its reading would only be the net energy transfer in one direction. By installing two meters with detent mechanisms connected to measure power in opposite directions, the desired readings of gross energy transfer in each direction are obtained. In the case of deep-well pump drives, the counter balancing of the induction-motor-driven geared pump heads which are widely used for deep-well pumping in oil fields is often not equal to the varying pump load so that the motor may be driven by the pump and therefore generate power during part of the pumping cycle. A watthour meter connected into such a drive system will run backwards at such times and thus reduce the net registration of the meter. Detents are used in such applications to prevent reverse rotation of the watthour meter.

Another typical application would be in the case of metering hydro-electric station spinning reserve equipment in which an idler hydro-electric generator is available to furnish full power on short notice. Such idler generators are usually run as motors on the line at synchronous speed with the hydraulic turbine case empty. It is then only necessary to open the wicket gates to load the unit thus saving the time otherwise required to bring the generator up to speed and synchronism. Two watthour meters with detents are used, connected to measure power flow in opposite directions, so that one indicates the generated power and the other the power used in motoring the generator on the line.

Detent mechanisms have heretofore been used for such metering applications and it is an object of this invention to provide a new and improved form of detent mechanism which is simpler, more efficient, less costly, and easier to install then those heretofore used.

The object of the invention together with its benefits and advantages will be fully understood upon reference to the detailed description which follows, particularly when taken in conjunction with the single sheet of drawings annexed hereto, in which:

FIGURE 1 is a view of a portion of a polyphase watthour meter equipped with the detent mechanism;

FIGURE 2 is an exploded perspective view of the essential parts which form the improved detent mechanism;

FIGURE 3 is a portion of the meter shaft illustrating a shoulder which is provided to simplify installation of the detent mechanism;

FIGURE 4 is a view looking down on top of the detent mechanism showing the position of the cooperating parts when the associated watthour meter is rotating in its proper direction; and FIGURE 5 is a view similar to FIGURE 4 which shows the relative position of the cooperating parts of the detent mechanism when the associated watthour meter runs in the opposite or negative direction.

Referring first to FIGURE 1, there is shown a portion of a polyphase induction watthour meter which in this case happens to be a so-called V meter by reason of the fact that the meter has two stator elements which are arranged in a V manner in relation to the meter disc. Thus, the meter comprises the V-shaped frame 6 on which is mounted, by any suitable means, the stator elements 7 and 8. The frame 6 is cut away in the right-hand portion of FIGURE 1 to better illustrate the type of stator element that is used, and it is seen that such element is the well-known single stator which comprises the E-shaped potential flux core and the U-shaped current flux core on which the potential and current windings are mounted, respectively.

Suitably journalled in the frame 6 is the meter shaft 9 to which is affixed the meter disc 11 which cooperates in a known manner wth the stator elements to rotate when power flows through the stator windings. A register mechanism, not shown, may be geared to shaft 9 and thus indicate the power used.

The shaft 9 is magnetically suspended in the frame 6 in a manner which is generally shown in U.S. Patent No. 2,311,382 issued to Hansen and assigned to the assignee of the within application. The precise details of the shaft journalling arrangements as well as the details of the stator elements, the frame, the usual base, the cover, wiring, and terminals which form the complete self-contained type watthour meter need no further elaboration herein since they are well known in the art and form no part of the present invention. It is sufficient for purposes of illustrating the subject invention to bear in mind that the upper bearing 12 comprises the magnetic suspension system and the lower bearing 13 comprises the usual guide bearing system associated with magnetically suspended watthour meters, both types of bearing systems being similar to that shown in the aforesaid Hansen patent.

Heretofore, and in connection with conventional jewelled bearing meter shaft suspensions, detent mechanisms have been mounted near the top of the meter shaft, but with a magnetic suspension system used for the top bearing of the meter shaft, it has been found that it is not practical to attempt to mount detent mechanisms at the top of the shaft.

The improved detent mechanism is located at the lower part of the meter shaft below the meter disc and it comprises a ratchet wheel 14 and a pawl member 15.

As is best shown in FIGURE 2, the ratchet wheel includes an elongated cylindrical hub portion 16 around which are spaced a plurality of elongated ratchet teeth 17 which have generally straight sides 17a and 17b extending substantially radially outwardly from the hub portion 16. Ratchet wheel 14 is concentrically mounted on shaft 9 and is positively located along the shaft by seating it against the shoulder 9a shown in FIGURE 3; and is held in place by a set screw which passes through the threaded aperture 18 formed in the ratchet wheel.

The pawl member 15 is a substantially flat annular sheet metal part which surrounds the ratchet wheel and includes a pair of diametrically opposed pawl teeth 19, each of which has an inclined side 19a and a generally straight radially extending side 19b. The pawl member 15 also includes a pair of diametrically opposed downturned ears 21, each of which is apertured at its lower end to slip over the pins 22 carried by collar 23 which seats on a flat portion 24 of frame 6. The collar 23 surrounds both the shaft 9 and the lower bearing system 13 and is securely held in place by means of a set screw which passes through the threaded aperture 25 provided therein.

With the above arrangement of parts in mind, it is apparent that the pawl member 15 is pivotally mounted with respect to the meter frame and can reciprocate in a direction substantially perpendicular to the meter shaft. As seen in FIGURE 4, when the meter shaft is rotating at its proper direction, the straight edges of the ratchet teeth will slide by the inclined edges of the pawl teeth, automatically engaging these teeth and thus reciprocating the pawl member from side to side about its pivot axis. When the ratchet teeth first engage the inclined edge of the pawl teeth, the engaged tooth will move outwardly away from the ratchet wheel until it passes the dead center portion of the pawl member after which it will drop over by gravity to its outer position in which the other pawl tooth will come to rest against the cylindrical hub portion of the ratchet wheel. The pawl member will remain in this position until the innermost pawl tooth is engaged by a ratchet tooth and moved outwardly in the manner described above.

Should the meter shaft rotate in the opposite direction, it is seen in FIGURE 5 how the straight side of the pawl tooth will catch one of the straight sides of one of the ratchet teeth and thus stop further rotation of the meter shaft. Either one of the pawl teeth may engage a ratchet tooth, depending upon which pawl tooth may be resting against the hub portion of the ratchet wheel. With two pawl teeth and five ratchet teeth, it is apparent that the meter shaft will be stopped within one-tenth of a reverse revolution. Since the two alternate at-rest positions of the pawl member are stable by reason of the action of gravity, positive engagement of the ratchet teeth upon reverse rotation will always occur.

There are three primary advantages of the aforesaid detent mechanism, derived from the shape of the parts, the manner in which they are formed, and the manner in which they cooperate when in use. For example, and first, with the pawl member relatively thin compared to the elongated ratchet wheel, it is apparent that the detent mechanism is insensitive to positional adjustments of the parts during installation on the watthour meter. With the ratchet wheel positively seated against the shoulder on the rotor shaft and the pawl supporting collar seated on the meter frame, the positioning of the parts is automatically correct and requires no further adjustment. This, of course, results not only from the relative dimensions of the cooperating parts but also because the teeth of the two parts radially engage one another.

A second advantage results from the fact that the relation of the paw teeth to one another, which is critical for proper operation of the detent mechanism, is accurately controlled since the pawl member is formed from a thin sheet metal part which may be blanked in the flat by one die with no subsequent forming. Thus, the angles and location of the pawl teeth may be accurately and precisely controlled.

Lastly, the detent mechanism is substantially unaffected by vibrations of low acceleration, since in its position of rest, the pawl member is held against the ratchet wheel by its weight acting through its center of gravity, which is above and out of line with the pivot axis for either position of the pawl. The pawl member will not move as the result of vibration until the acceleration reaches a value sufficient to overcome the off-center weight of the pawl.

All in all, the improved detent mechanism is easily formed, easily installed, and is positive and reliable in its operation.

Therefore, while a particular embodiment of the subject invention has been shown and described herein, it is in the nature of description rather than limitation, and it will occur to those skilled in the art that various changes, modifications, and combinations may be made within the province of the appended claims, and without departing either in spirit or scope from this invention in its broader aspects.

What we claim as new and desire to secure by Letters Patent of the United States is:

1. In an induction watthour meter which includes a supporting frame and a vertical shaft rotatably mounted in said frame, a detent mechanism for allowing only unidirectional rotation of the shaft, said detent mechanism comprising: a ratchet wheel concentrically mounted on the shaft, the ratchet wheel having a plurality of spaced radially extending ratchet teeth, a substantially flat annular pawl member surrounding the ratchet wheel, and means for pivotally mounting the pawl member on the frame whereby the pawl member may move substantially perpendicular to the shaft, the axis of said pivotally mounting means being perpendicular to the axis of the shaft, the pawl member being relatively thin compared to the thickness of the ratchet teeth in a direction along the axis of the shaft, the pawl member having a pair of diametrically opposed pawl teeth which cooperate with the ratchet teeth, the center of gravity of the pawl member being above and out of line with its pivot axis whenever either of the pawl teeth are at rest against a portion of the ratchet wheel, said pawl teeth being provided with an inclined side and a straight side such that the ratchet teeth will slide by the pawl teeth when the shaft is rotating in one direction but when the shaft rotates in the opposite direction the pawl teeth will catch the ratchet teeth to stop further rotation of the shaft.

2. The combination defined by claim 1 wherein the pawl teeth are alternately engaged by the ratchet teeth as the ratchet wheel rotates to reciprocally move the pawl member about its pivot axis, one pawl tooth resting against a portion of the ratchet wheel lying between adjacent ratchet teeth following engagement of the other pawl tooth.

3. In an induction watthour meter which includes a supporting frame and a vertical shaft rotatably mounted in said frame, a detent mechanism for allowing only unidirectional rotation of the shaft, said detent mechanism comprising: a ratchet wheel concentrically mounted on the shaft, the shaft having a shoulder against which the ratchet wheel may be seated to properly position the ratchet wheel along the shaft, the ratchet wheel having an elongated cylindrical hub portion around which are spaced a plurality of elongated ratchet teeth, the ratchet teeth having generally straight sides which extend substantially radially outwardly from said hub portion, a substantially flat annular sheet metal pawl member surrounding the ratchet wheel and having a pair of diametrically opposed downturned ears, a collar surrounding the shaft below the ratchet wheel and seated on the meter frame, and means for pivotally mounting the lower ends of the downturned ears in opposite sides of the collar, the pawl member having a pair of diametrically opposed pawl teeth formed in its flat portion, each of the pawl teeth having an inclined side which slides by the ratchet teeth when the shaft rotates in one direction to thereby reciprocate the pawl member about its pivot axis in a direction at right angles to the shafts, the pawl teeth also having a straight generally radially extending side which catches one of the striaght sides of the ratchet teeth when the shaft rotates in the opposite direction, the pawl teeth alternately lying against the surface of the cylindrical hub portion between adjacent ratchet teeth following engagement with the ratchet teeth, the center of gravity of the pawl member being above and out of line with its pivot axis whenever either of the pawl teeth are at rest against the surface of the cylindrical hub portion.

4. In an induction watthour meter including a supporting frame and having a rotatably mounted vertical shaft arranged to rotate in a predetermined direction, a detent mechanism therefor comprising, in combination: a ratchet wheel mounted on the shaft, the ratchet wheel having a plurality of radially extending ratchet teeth, each of the ratchet teeth being elongated in a direction along the axis of the shaft, and a substantially flat pawl member surrounding the ratchet wheel and disposed substantially perpendicular to the shaft, a collar member fixed in said frame and surrounding said shaft below said ratchet wheel, means pivotally mounting said pawl member to said collar member about an axis perpendicular to the axis of said shaft whereby said pawl member may move substantially perpendicular to said shaft, said pawl member including a pair of diametrically opposed pawl teeth, the center of gravity of said pawl member being above and out of line with its pivot axis whenever either of its pawl teeth rest against a portion of said ratchet wheel, said pawl teeth being provided with an incline side and a straight side such that the ratchet teeth will slide by the pawl teeth when the shaft is rotating in said predetermined direction but when the shaft rotates in the opposite direction the pawl teeth will catch the ratchet teeth to stop further rotation of the shaft in the opposite direction.

References Cited in the file of this patent

UNITED STATES PATENTS

| | | |
|---|---|---|
| 260,551 | Elsey | July 4, 1882 |
| 1,023,972 | Starnes | Apr. 23, 1912 |
| 2,294,510 | Nakano | Sept. 1, 1942 |

FOREIGN PATENTS

| | | |
|---|---|---|
| 19,422 | Great Britain | Sept. 30, 1901 |